US008709180B2

(12) United States Patent
Adell

(10) Patent No.: US 8,709,180 B2
(45) Date of Patent: Apr. 29, 2014

(54) METHOD AND APPARATUS FOR POSITIONING DOOR EDGE GUARD

(76) Inventor: Loren S. Adell, Frisco, TX (US)

( * ) Notice: Subject to any disclaimer, the term of this patent is extended or adjusted under 35 U.S.C. 154(b) by 0 days.

(21) Appl. No.: 12/925,551

(22) Filed: Oct. 25, 2010

(65) Prior Publication Data
US 2012/0097314 A1 Apr. 26, 2012

(51) Int. Cl.
B29C 65/00 (2006.01)
B60J 5/00 (2006.01)

(52) U.S. Cl.
USPC .............................................. 156/60; 49/462

(58) Field of Classification Search
USPC .............................................................. 49/462
See application file for complete search history.

(56) References Cited

U.S. PATENT DOCUMENTS 6,716,487 B1 * 4/2004 Song .............................. 427/535

OTHER PUBLICATIONS

2010 Toyota Venza Door Edge Guard Installation Instructions available from http://www.toyotapart.com on Dec. 22, 2009. Accessed by the examiner on Apr. 12, 2012 at www.toyotapart.com/PT936-0T100-07.pdf.*

* cited by examiner

Primary Examiner — Katarzyna Wyrozebski Lee
Assistant Examiner — Carson Gross
(74) Attorney, Agent, or Firm — W. Thomas Timmons

(57) ABSTRACT

A template for positioning a door edge guard on a vehicle is disclosed. The template includes a main body, an edge, which can form a cutout, which aligns with an item of known fixed position on the vehicle, such as a door handle, and a stop extending from the main body of the template to position one end of the door edge guard. The template is taped onto the vehicle or an easily removed adhesive is used or the template is magnetic. A method for positioning a door edge guard on a vehicle, includes the steps of creating a template having a main body, a cutout formed in the main body to fit over an item of known fixed position on the vehicle, and a stop extending from the main body, positioning the template so that the cutout fits over the item of known fixed position on the vehicle and the stop extends to the edge of the door, which is to receive the door edge guard, and positioning the door edge guard on the edge of the door so the one end of the door edge guard abuts the stop. In a preferred method, the item of known fixed position on the vehicle is the door handle that is on the door to which the door edge guard is applied. A preferred method also includes either taping the template in place or including an easily removed adhesive on the vehicle side of the template.

9 Claims, 3 Drawing Sheets

METHOD AND APPARATUS FOR POSITIONING DOOR EDGE GUARD

CROSS-REFERENCE TO RELATED APPLICATIONS

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to installation of door edge guards for vehicles, and in particular to installation of door edge guards at automotive dealerships.

2. Description of Related Art

In the past, door edge guards are fitted by individual installers based on what looks right, but there has been no uniformity of how such door edge guards are installed.

BRIEF SUMMARY OF THE INVENTION

A template according to the present invention, for positioning a door edge guard on a vehicle, includes a main body of the template, a cutout formed in the main body of the template to fit over an item of known fixed position on the vehicle, and a stop extending from the main body of the template to position one end of the door edge guard, whereby the door edge guard is positioned with respect to the item of known fixed position on the vehicle. In a preferred form of the invention, the item of known fixed position on the vehicle is the door handle that is on the door to which the door edge guard is applied. A preferred form of the invention also includes an easily removed adhesive on the vehicle side of the template or a double sided magnet.

A method according to the present invention, for positioning a door edge guard on a vehicle, includes the steps of creating a template having a main body, an edge formed in the main body to align with an item of known fixed position on the vehicle, and a stop extending from the main body, positioning the template so that the cutout fits over the item of known fixed position on the vehicle and the stop extends to the edge of the door, which is to receive the door edge guard, and positioning the door edge guard on the edge of the door so the one end of the door edge guard abuts the stop, whereby the door edge guard is positioned with respect to the item of known fixed position on the vehicle. Where applicable, the edge formed in the main body is basically a cutout formed in the main body to fit over an item of known fixed position on the vehicle. In a preferred method, the item of known fixed position on the vehicle is the door handle that is on the door to which the door edge guard is applied. A preferred method also includes the step of taping the template in place after positioning the template so that the cutout fits over the item of known fixed position on the vehicle and the stop extends to the edge of the door, which is to receive the door edge guard. In an alternative method, the template includes an easily removed adhesive on the vehicle side of the template or the template includes a double sided magnet in order to adhere to the door or to the automobile body.

These and other objects, advantages and features of this invention will be apparent from the following description taken with reference to the accompanying drawing, wherein is shown a preferred embodiment of the invention.

DETAILED DESCRIPTION OF THE INVENTION

Figure 1:
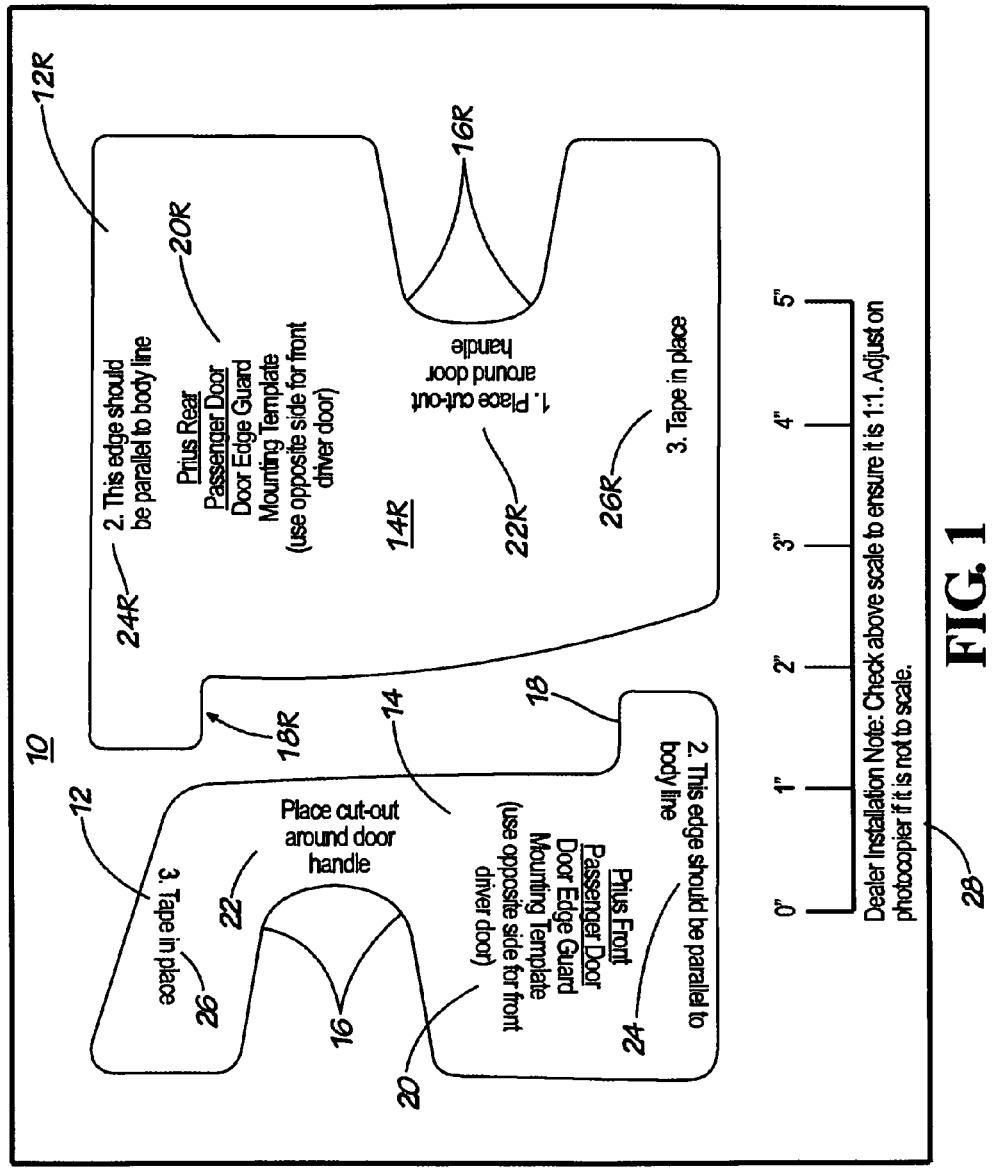
FIG. 1 is a combined front door edge guard template according to the present invention and rear door edge guard template according to the present invention along with instructions suitable for delivery to a car dealer for after factory installation of door edge guards.

Referring now to the drawing, and in particular to FIG. 1, a combined template sheet suitable for delivery to a automobile dealer is referred to generally by reference numeral 10. Combined template sheet 10 includes a front passenger door template 12 according to the present invention, for positioning a door edge guard on the front passenger side door of a vehicle. Front passenger side door template 12 includes a main body 14 of the template, a cutout 16 formed in the main body of the template to fit over an item of known fixed position on the vehicle, and a stop 18 extending from the main body of the template to position one end of the door edge guard. Front passenger side door template 12 also exhibits instructions for proper use, including a location instruction 20 "Prius Front Passenger Door Door Edge Guard Mounting Template (use opposite side for front driver door)", a placement instruction 22 "1. Place cut-out around door handle," a rotation instruction 24 "2. This edge should be parallel to the body line," and an attachment instruction 26 "Tape in place." Combined template sheet 10 also includes a rear passenger door template 12R, in which similar elements are similarly numbered to that of the front passenger door template 12 but with the added letter "R." A note 28 regarding scale is near the bottom of combined template sheet 10 "Dealer installation Note: Check above scale to ensure it is 1:1. Adjust on photocopier if it is not to scale."

Figure 2:
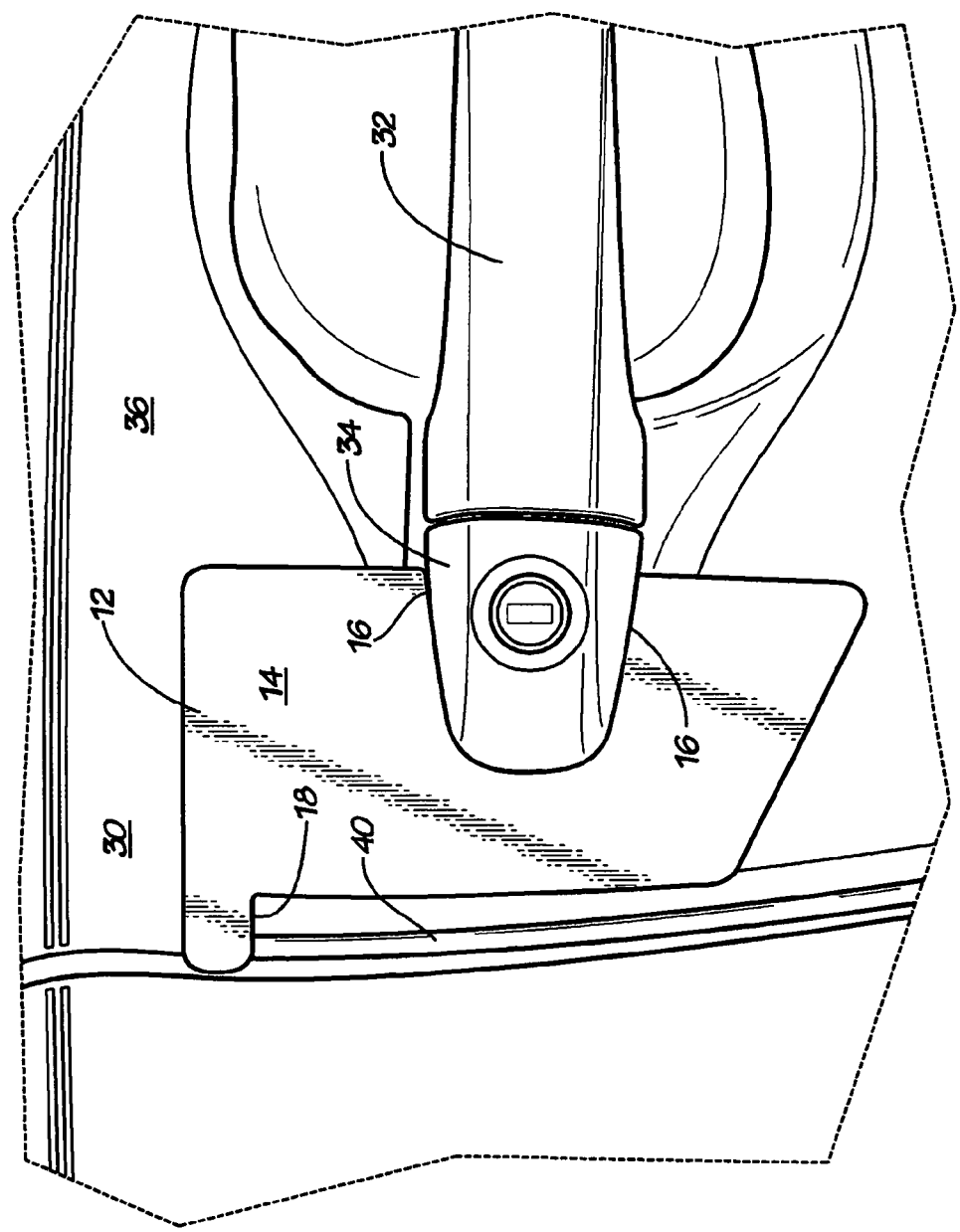
FIG. 2 is the front door edge guard template being used to install a door edge guard on the front door of an automobile.

Referring now to FIG. 2, door edge guard 12 is positioned with respect to the item of known fixed position on a vehicle 30, in this case, the item of known fixed position on the vehicle is a door handle 32, including handle door lock 34, that is on door 36 to which door edge guard 12 is applied. A preferred form of the invention also includes an easily removed adhesive 38, not shown, on the vehicle side of the template. In another preferred form, the template includes a double sided magnet 39, not shown, or be entirely magnetic, so that the template will adhere to the door or the automobile body.

A method according to the present invention, for positioning door edge guard 40 on vehicle 30, includes the steps of creating a template 12 having a main body 14, an edge formed in the main body to align with an item of known fixed position, in the embodiment illustrated, the edge is cutout 16 formed in the main body to fit over the item of known fixed position on vehicle 30 and a stop 18 extending from the main body, positioning template 12 so that cutout 16 fits over the item of known fixed position on the vehicle and stop 18 extends to the edge of door 36, which is to receive the door edge guard, and positioning the door edge guard on the edge of the door so the one end of door edge guard 40 abuts stop 18. Thus the door edge guard is positioned with respect to the item of known fixed position on the vehicle. In a preferred method, the item of known fixed position on the vehicle is door handle 32, including handle door lock 34, that is on the door to which the door edge guard is applied. A simple alignment edge formed in the main body would be necessary for vehicles with recessed handles. In such a case the edge might align with the bottom of a window or the bottom of a door. A preferred method also includes the step of taping the template in place after positioning the template so that the cutout fits over the item of known fixed position on the vehicle and the stop extends to the edge of the door, which is to receive the door edge guard. In an alternative method, the template includes an easily removed adhesive on the vehicle side of the template. In another alternative method, the template includes or is entirely constructed from a double sided magnet, which would adhere to the door or the automobile body as needed.

Figure 3:
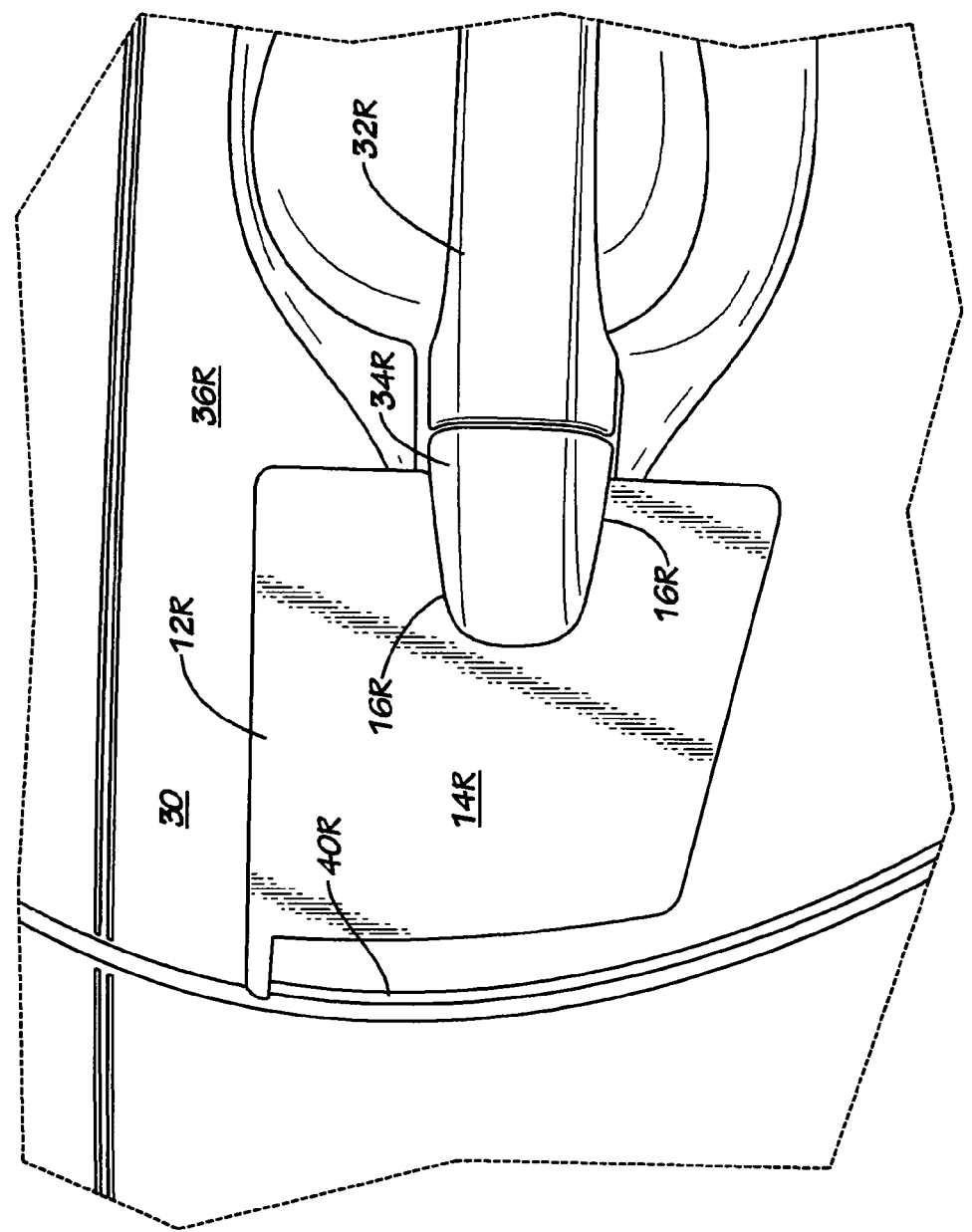
FIG. 3 is the rear door edge guard template being used to install a door edge guard on the rear door of an automobile.

Referring now to FIG. 3, door edge guard 12R is positioned with respect to the item of known fixed position on vehicle 30, in this case, the item of known fixed position on the vehicle is a door handle 32R, including handle door lock 34R, that is on door 36R to which door edge guard 12R is applied. A preferred form of the invention also includes an easily removed adhesive 38R, not shown, on the vehicle side of the template. In another preferred form, the template includes a double sided magnet 39R, not shown, or be entirely magnetic, so that the template will adhere to the door or the automobile body.

From the foregoing it will be seen that this invention is well adapted to attain all of the ends and objectives hereinabove set forth, together with other advantages which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the figures of the accompanying drawings is to be interpreted as illustrative and not in a limiting sense.

The invention claimed is:

1. A method for positioning a door edge guard on a vehicle, comprising in combination the steps of:

creating a template having a main body, an edge formed in the main body of the template to align with an item of known fixed position on the vehicle; and a stop extending from the main body;

positioning the template so that the edge formed in the main body aligns with the item of known fixed position on the vehicle and the stop extends to the edge of the door, which is to receive the door edge guard; and positioning the door edge guard on the edge of the door so the one end of the door edge guard abuts the stop, whereby the door edge guard is positioned with respect to the item of known fixed position on the vehicle.

2. A method according to claim 1, wherein the edge formed in the main body comprises a cutout formed in the main body to fit over the item of known fixed position on the vehicle, and the step of positioning the template comprises positioning the template so that the cutout fits over the item of known fixed position on the vehicle and the stop extends to the edge of the door, which is to receive the door edge guard.

3. A method according to claim 2, wherein the item of known fixed position on the vehicle is the door handle that is on the door to which the door edge guard is applied.

4. A method according to claim 3, also comprising the step of taping the template in place after positioning the template so that the cutout fits over the door handle that is on the door to which the door edge guard is applied and the stop extends to the edge of the door, which is to receive the door edge guard.

5. A method according to claim 2, wherein the step of positioning the template comprises the step of removing the backing from an adhesive on the vehicle side of the template.

6. A method according to claim 2 wherein the step of positioning the template comprises magnetically adhering the template in position.

7. A method according to claim 1, also comprising the step of taping the template in place after positioning the template so that the edge aligns with the item of known fixed position on the vehicle and the stop extends to the edge of the door, which is to receive the door edge guard.

8. A method according to claim 1, wherein the step of positioning the template comprises the step of removing the backing from an adhesive on the vehicle side of the template.

9. A method according to claim 1 wherein the step of positioning the template comprises magnetically adhering the template in position.

* * * * *